(12) United States Patent
Akita et al.

(10) Patent No.: US 8,680,819 B2
(45) Date of Patent: Mar. 25, 2014

(54) FIELD WINDING TYPE ROTARY ELECTRIC MACHINE

(75) Inventors: Kenichi Akita, Tokyo (JP); Masato Mori, Tokyo (JP); Kenji Nakajima, Tokyo (JP); Mitsunori Tabata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 380 days.

(21) Appl. No.: 13/073,483

(22) Filed: Mar. 28, 2011

(65) Prior Publication Data

US 2012/0112709 A1    May 10, 2012

(30) Foreign Application Priority Data

Nov. 4, 2010  (JP) .................................. 2010-247470

(51) Int. Cl.
*H02P 11/00*  (2006.01)
*H02P 9/00*   (2006.01)

(52) U.S. Cl.
USPC .............................................. 322/24; 322/59

(58) Field of Classification Search
USPC ..................... 322/24, 28, 26, 44, 59
See application file for complete search history.

(56) References Cited

U.S. PATENT DOCUMENTS

| | | | |
|---|---|---|---|
| 6,043,632 A * | 3/2000 | Maehara et al. | 322/28 |
| 6,362,588 B1 * | 3/2002 | Umans et al. | 318/521 |
| 6,404,089 B1 * | 6/2002 | Tomion | 310/162 |
| 2004/0150233 A1 * | 8/2004 | Kajiura | 290/24 |
| 2006/0214426 A1 | 9/2006 | Asao et al. | |
| 2010/0301816 A1 * | 12/2010 | Akita et al. | 322/34 |
| 2011/0068752 A1 * | 3/2011 | Nakada et al. | 322/28 |

FOREIGN PATENT DOCUMENTS

| | | | | |
|---|---|---|---|---|
| JP | 04-229100 A | 8/1992 | | |
| JP | 08-009567 A | 1/1996 | | |
| JP | 8-098598 A | 4/1996 | | |
| JP | 08098598 A | * 4/1996 | ................ | H02P 9/14 |
| JP | 10-056799 A | 2/1998 | | |

OTHER PUBLICATIONS

Japanese Office Action, Patent Application No. 2010-247470, issued Nov. 6, 2012.

* cited by examiner

*Primary Examiner* — Julio Gonzalez R
(74) *Attorney, Agent, or Firm* — Sughrue Mion, PLLC

(57) ABSTRACT

A field winding type rotary electric machine includes a motor generator; a field current detection unit; a field current control unit which controls a field current; a field current limiting determination section which calculates a field current integration value and determines whether or not the field current integration value reaches a predetermined field current integration threshold value; and a field current limiting command section which, when it is determined that the field current integration value reaches the predetermined field current integration threshold value, outputs a command which sets the field current to be lower than or equal to a predetermined field current limiting value to the field current control unit during a predetermined limiting time, and outputs a command which changes the predetermined limiting time depending on the field current. Accordingly, a temperature rise of the machine is suppressed and limiting of the field current can be released as needed.

10 Claims, 8 Drawing Sheets

FIELD WINDING TYPE ROTARY ELECTRIC MACHINE

BACKGROUND OF THE INVENTION

1. Field of the Invention

The present invention relates to a field winding type rotary electric machine having an armature winding and a field winding, the field winding type rotary electric machine being mounted mainly on a vehicle and provided with a control device.

2. Description of the Related Art

Generally, a vehicular rotary electric machine is mounted on an engine room; and therefore, the operating temperature of the vehicular rotary electric machine reaches extremely high temperature. Furthermore, the internal temperature of the vehicular rotary electric machine reaches higher temperature due to the heat generated when the vehicular rotary electric machine performs operation such as power generation and driving. Accordingly, when the temperature of the vehicular rotary electric machine excessively rises due to long periods of continuous operation and the like, it is likely to generate failure in the vehicular rotary electric machine due to damage of internal components.

Therefore, in an output control method and an output control device of a conventional vehicular AC (alternating current) generator, as means for preventing failure of the vehicular AC generator due to a temperature rise, there is proposed a method in which, when the temperature of the AC generator or ambient temperature thereof is measured and it is detected that the measured temperature exceeds a preliminarily set abnormal temperature value, AC generator output current is limited to reduce thermal burden of the control device (for example, see Patent Document 1). More specifically, there is disclosed a technique in which a PWM (pulse width modulation) control comparator 910 compares a first or second level voltage outputted by a comparator 902 based on a temperature proportional voltage generate by an amplifier 901 with a triangular wave voltage generated by a triangular wave generator to generate a pulse width modulation wave signal; and in a temperature range exceeding a predetermined temperature, intermittent control of a power transistor 305 is performed by the pulse width modulation wave signal and accordingly a field current flowing through a field coil 102A is limited. This makes it possible to prevent defects caused by AC generation or thermal runaway of its control device.

RELATED ART DOCUMENT

Patent Document

[Patent Document 1] Japanese Published Patent Application No. 8-9567

However, in the output control method and the output control device of the conventional vehicular AC generator, the temperature of the vehicular AC generator is detected by a temperature sensor and the field current is limited; and accordingly, the vehicular AC generator is protected from the temperature rise. Therefore, there is a problem in that the temperature sensor needs to be mounted and an increase in cost and a change in structure of the vehicular AC generator are required.

SUMMARY OF THE INVENTION

The present invention is implemented to solve the foregoing problem, and an object of the present invention is to provide a field winding type rotary electric machine in which a temperature sensor is not necessarily needed, and in which a field current flowing through a field winding is limited and accordingly a temperature rise is suppressed and limiting of the field current can be released as needed.

In order to solve the foregoing problem, according to the present invention, there is provided a field winding type rotary electric machine which includes: a motor generator having a field winding; a field current detection unit which detects a field current flowing through the field winding; a field current control unit which controls the field current; a field current limiting determination section which calculates a field current integration value in which the field current detected by the field current detection unit is integrated by time, and determines whether or not the field current integration value reaches a field current integration threshold value; and a field current limiting command section which, when it is determined by the field current limiting determination section that the field current integration value reaches the field current integration threshold value, outputs a command which sets the field current to be lower than or equal to a predetermined field current limiting value to the field current control unit during a predetermined limiting time, and outputs a command which changes the predetermined limiting time depending on the field current.

According to a field winding type rotary electric machine of the present invention, it is possible to obtain a field winding type rotary electric machine which monitors a field current flowing through a field winding, limits the field current so that the temperature of the field winding type rotary electric machine does not excessively rise, and can release limiting of the field current at the timing when the temperature of the field winding type rotary electric machine is sufficiently lowered depending on a value of the field current.

The foregoing and other objects, features, aspects and advantages of the present invention will become more apparent from the following detailed description of the present invention when taken in conjunction with the accompanying drawings.

DETAILED DESCRIPTION OF THE INVENTION

Hereinafter, field winding type rotary electric machines according to Embodiments of the present invention will be described with reference to FIG. 1 to FIG. 8.

Figure 1:
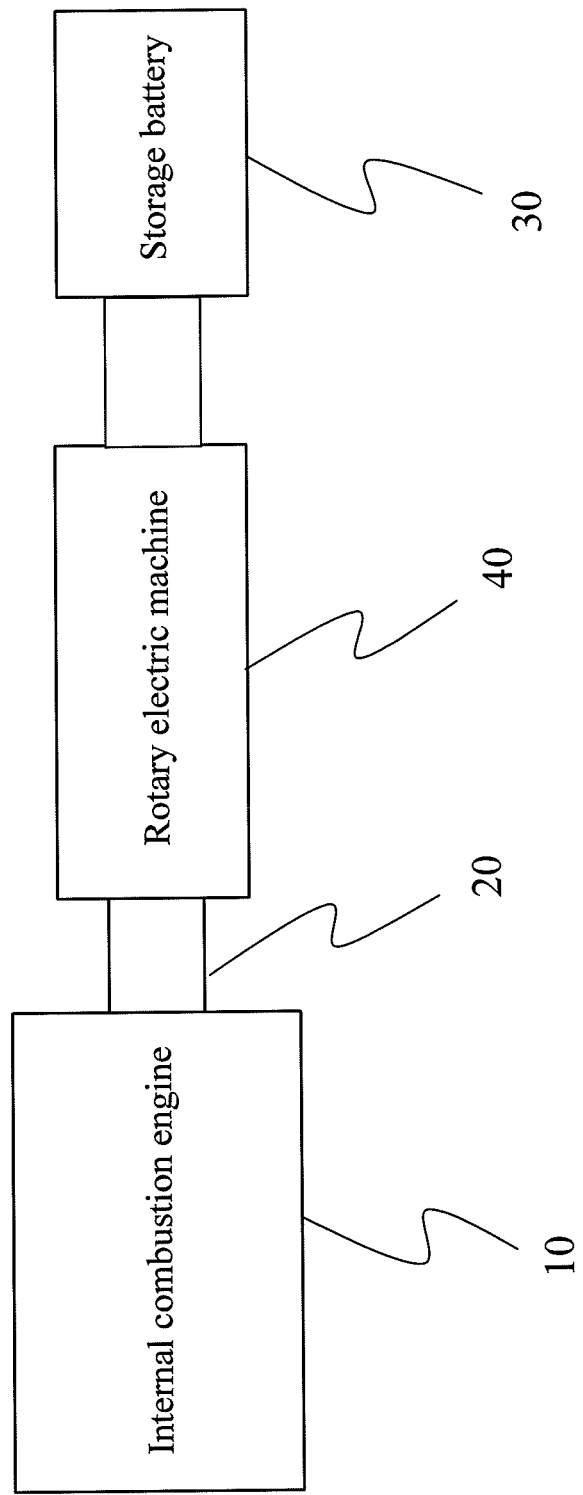
FIG. 1 is a schematic configuration diagram in the case where a field winding type rotary electric machine according to the present invention is mounted on a vehicle.

FIG. 1 is a schematic configuration diagram showing the case where a field winding type rotary electric machine according to the present invention is mounted on a vehicle; and as shown in the drawing, a field winding type rotary electric machine 40 is connected to an internal combustion engine 10 each other via coupling means 20 such as a belt and a pulley. Furthermore, a storage battery 30 is electrically connected to the field winding type rotary electric machine 40. Incidentally, there is a case where the field winding type rotary electric machine 40 is directly connected to the internal combustion engine 10 without via the coupling means 20. Further, the internal combustion engine 10 is not limited to either a gasoline engine or a diesel engine. Furthermore, the storage battery 30 may be used for only the field winding type rotary electric machine 40 or may be shared with other vehicle load other than the field winding type rotary electric machine 40.

Embodiment 1

Figure 2:
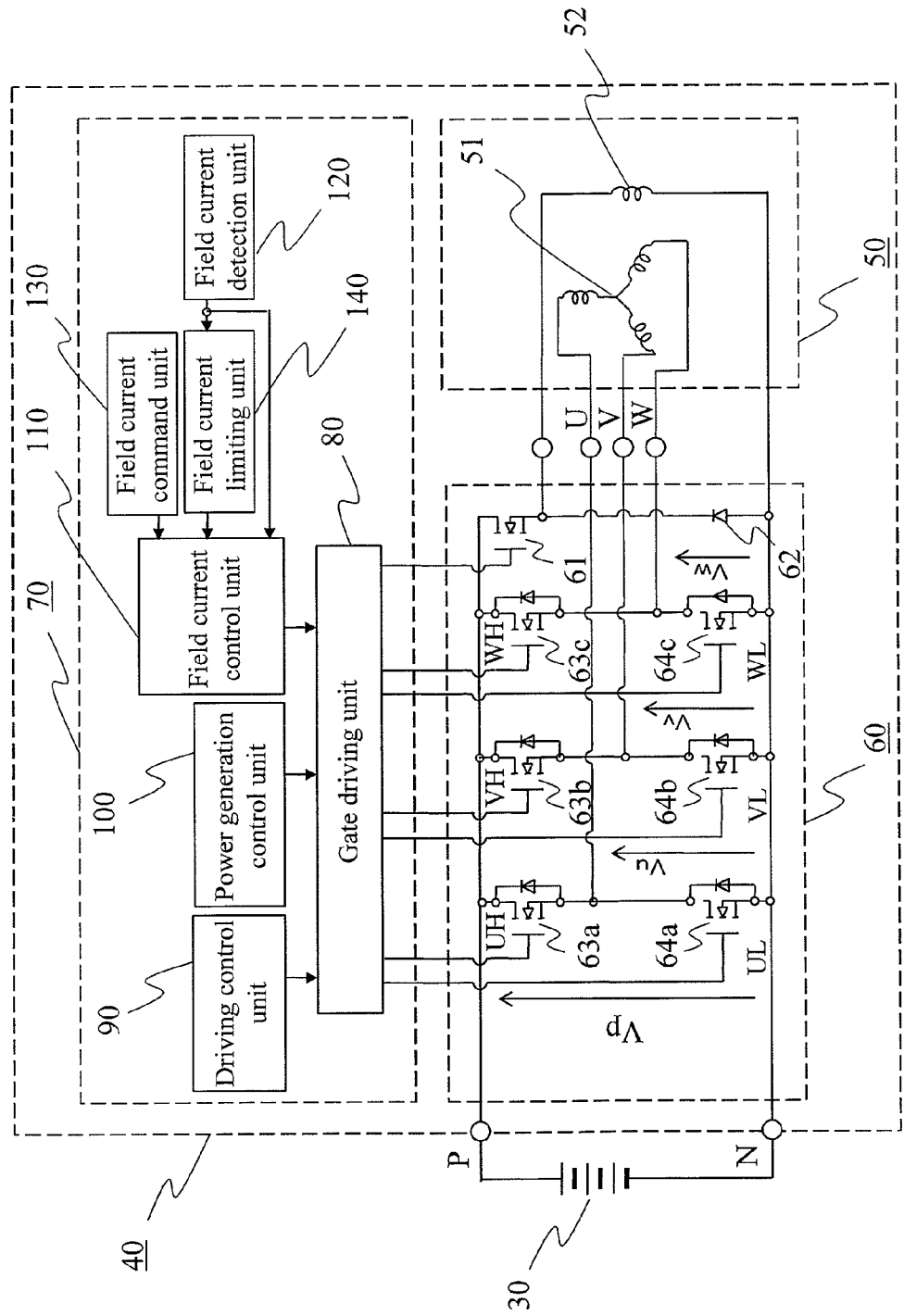
FIG. 2 is a configuration diagram of the field winding type rotary electric machine of Embodiment 1 of the present invention.
Figure 3:
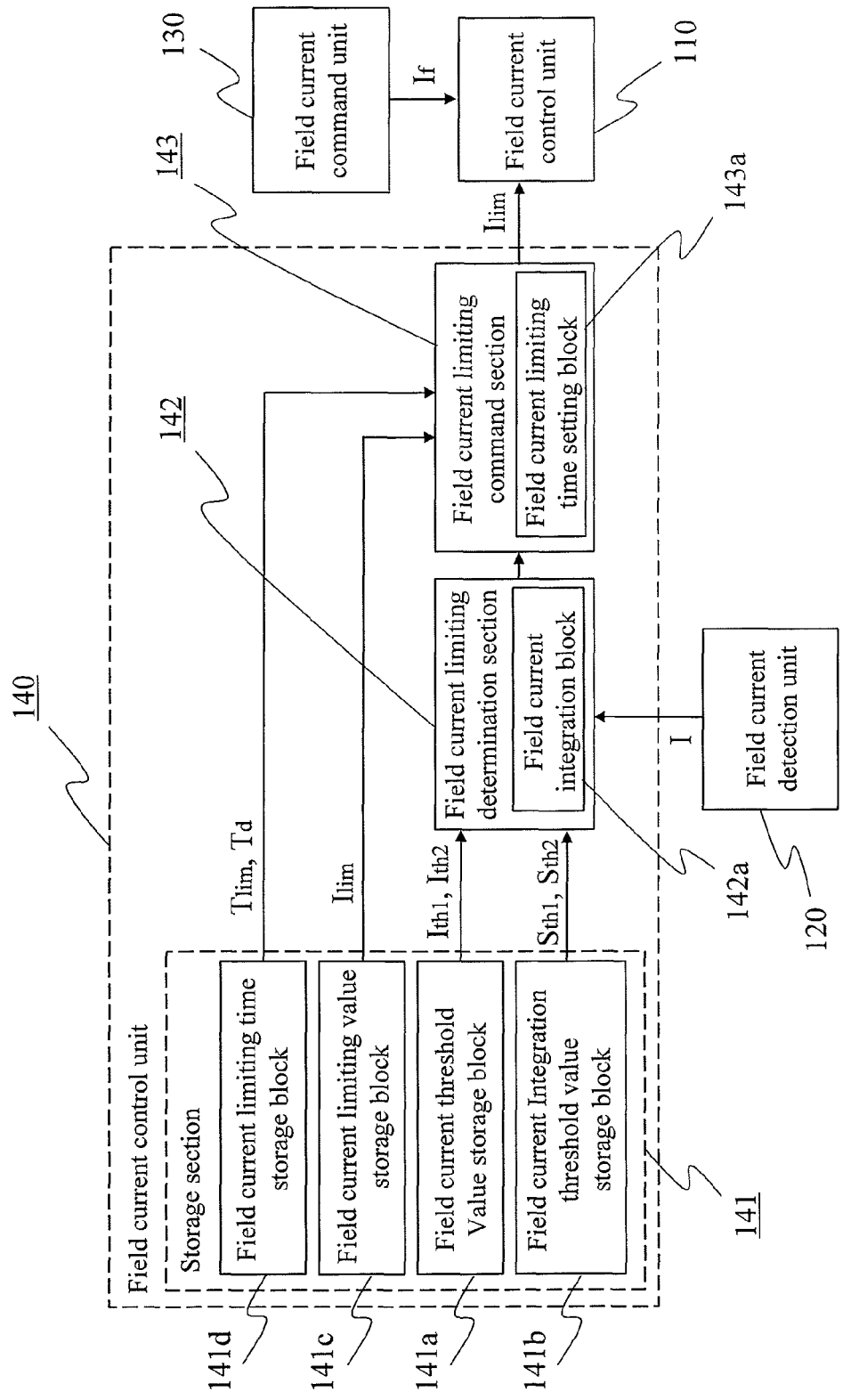
FIG. 3 is a configuration diagram of a field current limiting unit shown in FIG. 2 of Embodiment 1.
Figure 4:
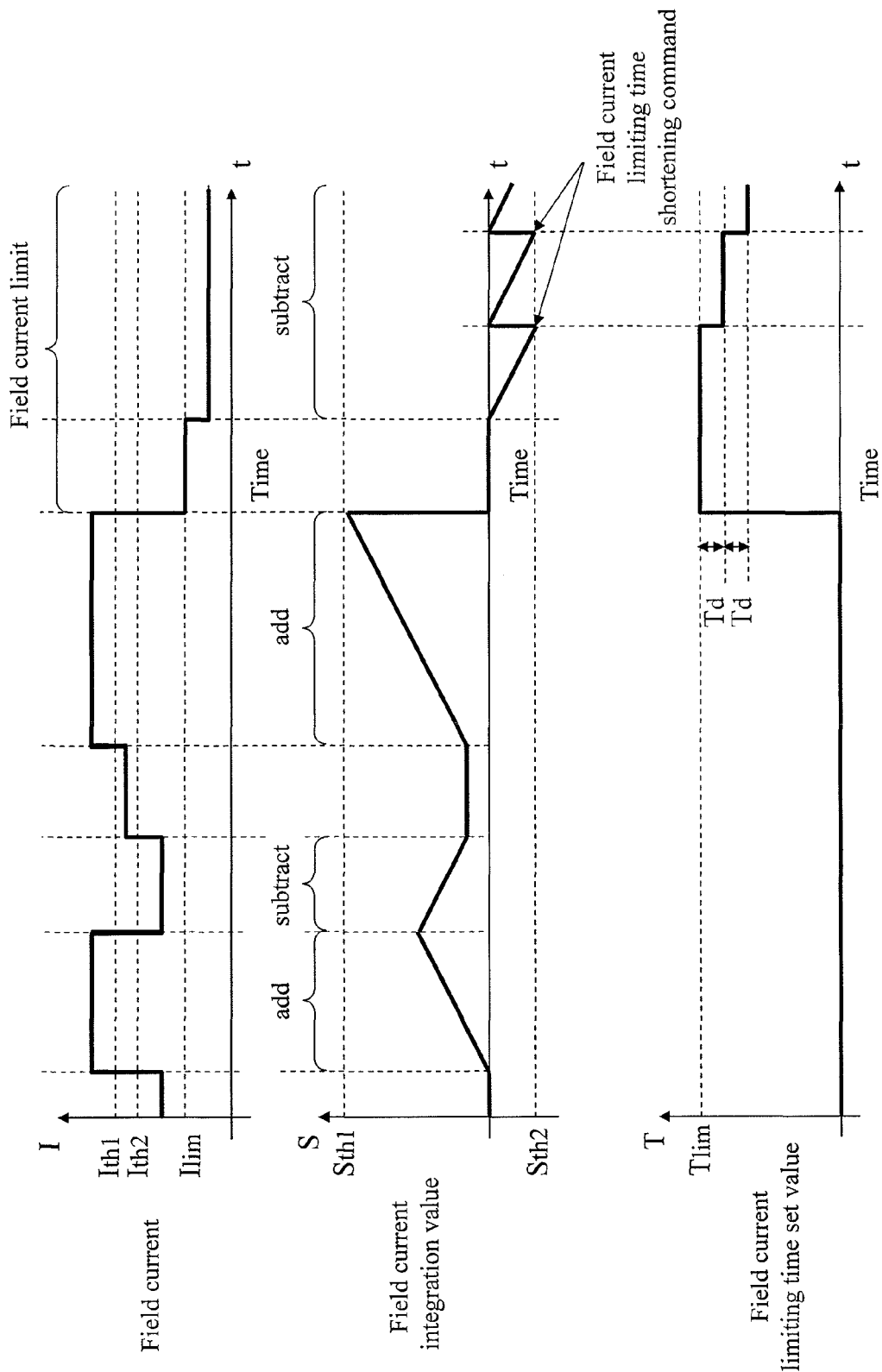
FIG. 4 is a view showing time changes in field current, field current integration value, and field current limiting time set value in the field current limiting unit according to Embodiment 1 of the present invention.

FIG. 2 is a configuration diagram of a field winding type rotary electric machine in Embodiment 1. FIG. 3 is a configuration diagram of a field current limiting unit of the field winding type rotary electric machine. FIG. 4 is a view showing time changes in field current, field current integration value, and field current limiting time set value in the field current limiting unit.

As shown in FIG. 2, the field winding type rotary electric machine of Embodiment 1 is composed of three main constituent parts as follows: a motor generator 50; a power converter 60; and a controller 70. The storage battery 30 is connected to the power converter 60 and the power converter 60 is supplied with electric power from the outside.

The motor generator 50 is provided with a three phase star connected or delta connected armature winding 51 and a field winding 52. Incidentally, the motor generator 50 may be one which uses an armature winding 51 other than three phases. The power converter 60 is a three phase inverter. The power converter 60 is a three phase inverter. The power converter 60 is provided with a field winding current switching element 61 and a flywheel diode 62, both of which are connected to the field winding 52; and the power converter 60 is provided with power conversion switching elements 63a to 63c and 64a to 64c, each of which is connected to each corresponding phase of the armature winding 51. The controller 70 is composed of a gate driving unit 80, a driving control unit 90, a power generation control unit 100, a field current control unit 110, a field current detection unit 120, a field current command unit 130, and a field current limiting unit 140.

The gate driving unit 80 drives the field winding current switching element 61 and the power conversion switching elements 63a to 63c and 64a to 64c to control driving and power generation of the motor generator 50 on the basis of ON/OFF commands to the armature winding 51 and the field winding 52, the ON/OFF commands being sent from the driving control unit 90, the power generation control unit 100, and the field current control unit 110. Furthermore, the driving control unit 90 performs ON/OFF timing control of the power conversion switching elements 63a to 63c and 64a to 64c at the time when the rotary electric machine 40 is driven. Further, the power generation control unit 100 performs ON/OFF timing control of the power conversion switching elements 63a to 63c and 64a to 64c at the time when synchronous rectification is performed during power generation of the rotary electric machine 40.

The field current detection unit 120 detects a field current I flowing through the field winding 52. The field current command unit 130 transmits a command to the field current control unit 110 so that the field current I is to be a field current command value $I_f$ that is a control target.

The field current limiting unit 140 determines whether or not the field current I is to be limited on the basis of the field current I detected by the field current detection unit 120. As a result, when it is determined that limiting of the field current I is necessary, the field current limiting unit 140 transmits a command to the field current control unit 110 so that the field current I is to be limited to a field current limiting value $I_{lim}$.

In this case, when the field current control unit 110 receives the command from the field current limiting unit 140 that the field current I is to be limited to the field current limiting value $I_{lim}$, the field current control unit 110 delivers to the gate driving unit 80 a signal which controls the field current I flowing through the field winding 52 on the basis of the field current limiting value $I_{lim}$. In this regard, however, when the field current command value $I_f$ is lower than the field current limiting value $I_{lim}$, that is, when there is relationship in which the field current command value $I_f$ is lower than the field current limiting value $I_{lim}$, the field current control unit 110 delivers the signal which controls the field current I to be the field current command value $I_f$. On the contrary, when the field current control unit 110 does not receive the field current limiting value $I_{lim}$ from the field current limiting unit 140, the field current control unit 110 always delivers the signal which controls the field current I flowing through the field winding 52 on the basis of the field current command value $I_f$.

Next, operation of the field winding type rotary electric machine will be described in detail with reference to the configuration diagram of the field current limiting unit shown in FIG. 3 and the time changes in field current, field current integration value, and field current limiting time set value in the field current limiting unit shown in FIG. 4.

The field current limiting unit 140 is composed of a storage section 141, a field current limiting determination section 142, and a field current limiting command section 143. The storage section 141 is composed of a field current threshold value storage block 141a, a field current integration threshold value storage block 141b, a field current limiting value storage block 141c, and a field current limiting time storage block 141d. Furthermore, the field current limiting determination section 142 has a field current integration block 142a; and the field current limiting command section 143 has a field current limiting time setting block 143a.

In this case, a first field current threshold value $I_{th1}$ and a second field current threshold value $I_{th2}$ that is set to a value lower than the first field current threshold value $I_{th1}$ are preliminarily stored in the field current threshold value storage block 141a. That is, the relationship between the first and second field current threshold values $I_{th1}$, $I_{th2}$ is that the first field current threshold value $I_{th1}$ is higher than the second field current threshold value $I_{th2}$.

Furthermore, the field current limiting determination section 142 is connected to the field current integration threshold value storage block 141b; and a first field current integration threshold value $S_{th1}$ (>0) that is a positive value and a second field current integration threshold value $S_{th2}$ (<0) that is a negative value are previously stored in the field current integration threshold value storage block 141b.

Furthermore, the field current limiting value $I_{lim}$ is preliminarily stored in the field current limiting value storage block 141c. Field current limiting time $T_{lim}$ and field current limiting shortening time $T_d$ of the field current I are preliminarily stored in the field current limiting time storage block 141d.

Next, operation of the field current limiting determination section 142 will be described with reference to FIG. 4. First, when the field current I is higher than (>) the first field current threshold value $I_{th1}$, the field current limiting determination section 142 adds (integrates in a positive direction) a difference $\Delta I_1$ between the field current I and the first field current threshold value $I_{th1}$ to a field current integration value S. On the contrary, when the field current I is lower than (<) the second field current threshold value $I_{th2}$, the field current limiting determination section 142 subtracts (integrates in a negative direction) a difference $\Delta I_2$ between the second field current threshold value $I_{th2}$ and the field current I from the field current integration value S. Furthermore, when the field current I is lower than or equal to (≤) the first field current threshold value $I_{th1}$ and the field current I is equal to or higher than (≥) the second field current threshold value $I_{th2}$, the field current limiting determination section 142 maintains the present field current integration value S.

Next, when the field current integration value S is higher than the field current integration threshold value $S_{th1}$, the field current limiting determination section 142 determines that limiting of the field current I is necessary. Then, the field current limiting determination section 142 transmits a determined result to the field current limiting command section 143.

When it is determined that the limiting of the field current I is necessary on the basis of the determined result of the field current limiting determination section 142, the field current limiting command section 143 obtains the field current limiting value $I_{lim}$ from the field current limiting value storage block 141c and the field current limiting time $T_{lim}$ and the field current limiting shortening time $T_d$ from the field current limiting time storage block 141d, and sets the field current limiting time $T_{lim}$ as a field current limiting time set value T (Equation (1)).

$$T = T_{lim} \quad (1)$$

Then, the field current limiting command section 143 transmits the field current limiting value $I_{lim}$ to the field current control unit 110 during the field current limiting time $T_{lim}$. Accordingly, the field current control unit 110 which has received the field current limiting value $I_{lim}$ controls the field current I to a value of the field current limiting value $I_{lim}$ (in this regard, however, a value of the field current command value $I_f$ during the time that the relationship in which the field current command value $I_f$ is lower than the field current limiting value $I_{lim}$ is satisfied).

Incidentally, when the field winding type rotary electric machine performs continuous operation, the second field current threshold value $I_{th2}$ is set so that the temperature of the field winding type rotary electric machine 40 is within a normal operation range. Furthermore, the field current limiting value $I_{lim}$ at this time is set to be lower than or equal to the second field current threshold value $I_{th2}$ (see FIG. 4). This makes it possible to securely lower the temperature of the field winding type rotary electric machine 40 to a normally operable temperature.

In this case, when the field current integration value S exceeds the field current integration threshold value $S_{th1}$, the field current limiting determination section 142 clears the field current integration value S to set it to 0. Next, the field current limiting determination section 142 starts the calculation of the field current integration value S using the field current limiting value $I_{lim}$ as a threshold value instead of the second field current threshold value $I_{th2}$. That is, under conditions that the field current limiting value $I_{lim}$ is higher than the field current I, the field current limiting determination section 142 subtracts (integrates in a negative direction) a difference $\Delta I3$ between the field current limiting value $I_{lim}$ and the field current I from the field current integration value S.

In the case where the field current I is limited, when the field current integration value S is lower than or equal to the second field current integration threshold value $S_{th2}$ that is a negative value, that is, when the field current integration value S is lower than or equal to the second field current integration threshold value $S_{th2}$ the field current limiting determination section 142 transmits a field current limiting time shortening command to the field current limiting command section 143.

In the case where the field current limiting command section 143 receives the field current limiting time shortening command from the field current limiting determination section 142 during the limiting of the field current I, the field current limiting command section 143 subtracts the field current limiting shortening time $T_d$ from the field current limiting time $T_{lim}$, and the subtracted value is set to as a new field current limiting time set value T; and the field current limiting time setting block 143a measures the time for transmitting the field current limiting value $I_{lim}$ on the basis of the calculated field current limiting time set value T (Equation (2)).

$$T = T_{lim} - T_d \quad (2)$$

Furthermore, in the case where the field current I is limited, when the field current integration value S is lower than or equal to the second field current integration threshold value $S_{th2}$, the field current limiting determination section 142 clears the field current integration value S to set it to 0 and starts the calculation of the field current integration value S again. Then, as in the above mention, when the field current integration value S is lower than or equal to the second field current integration threshold value $S_{th2}$, the field current limiting determination section 142 transmits the field current limiting time shortening command to the field current limiting command section 143; and the field current limiting command section 143 subtracts the field current limiting shortening time $T_d$ from the field current limiting time set value T again.

In this case, the field current limiting command section 143 stops the transmission of the field current limiting value $I_{lim}$ for the field current control unit 110 at the elapse of the field current limiting time set value T after the limiting of the field current I is started. That is, the limiting of the field current I is released and the field current I is controlled on the basis of the field current command value $I_f$.

Accordingly, in the case where the field current I is limited by the field current limiting value $I_{lim}$, and when the field current I is lower than the field current limiting value $I_{lim}$, the field current limiting command section 143 can shorten the time in which the field current I is limited by the field current limiting value $I_{lim}$.

Incidentally, the field current limiting value $I_{lim}$ and the field current limiting time $T_{lim}$ according to Embodiment 1 of the present invention are set so that the temperature of the field winding type rotary electric machine 40 is at least within a normally operable temperature range from a relationship which is the actually measured relationship between the field current I and the temperature of the field winding type rotary electric machine 40. Furthermore, the field current limiting shortening time $T_d$ is also set to be a range of the time that is capable of being shortened in the case where the field current I is less than the field current limiting value $I_{lim}$ from the relationship between the field current I and the temperature of the field winding type rotary electric machine 40.

Furthermore, if the field current limiting value $I_{lim}$ and the field current limiting time $T_{lim}$ are switched in value depending on operation modes such as at the time of power generation and at the time of driving, the limiting time and the limiting value of the field current can be changed depending on the operation modes.

Furthermore, even when the field current limiting value $I_{lim}$ is set to a field current limiting value $I_{DUTYlim}$ which limits DUTY of field current control, the same effects can be obtained.

As described above, in the field winding type rotary electric machine according to Embodiment 1, the limiting time of the field current is made to change depending on the value of the field current during the limiting in the case where the field current is limited so that the temperature of the field winding type rotary electric machine does not excessively rise on the basis of the detected result of the field current flowing through the field winding; and therefore, there is a significant effect in that it is possible to obtain the field winding type rotary electric machine which can reduce the limiting of the field current as needed.

Embodiment 2

Figure 5:
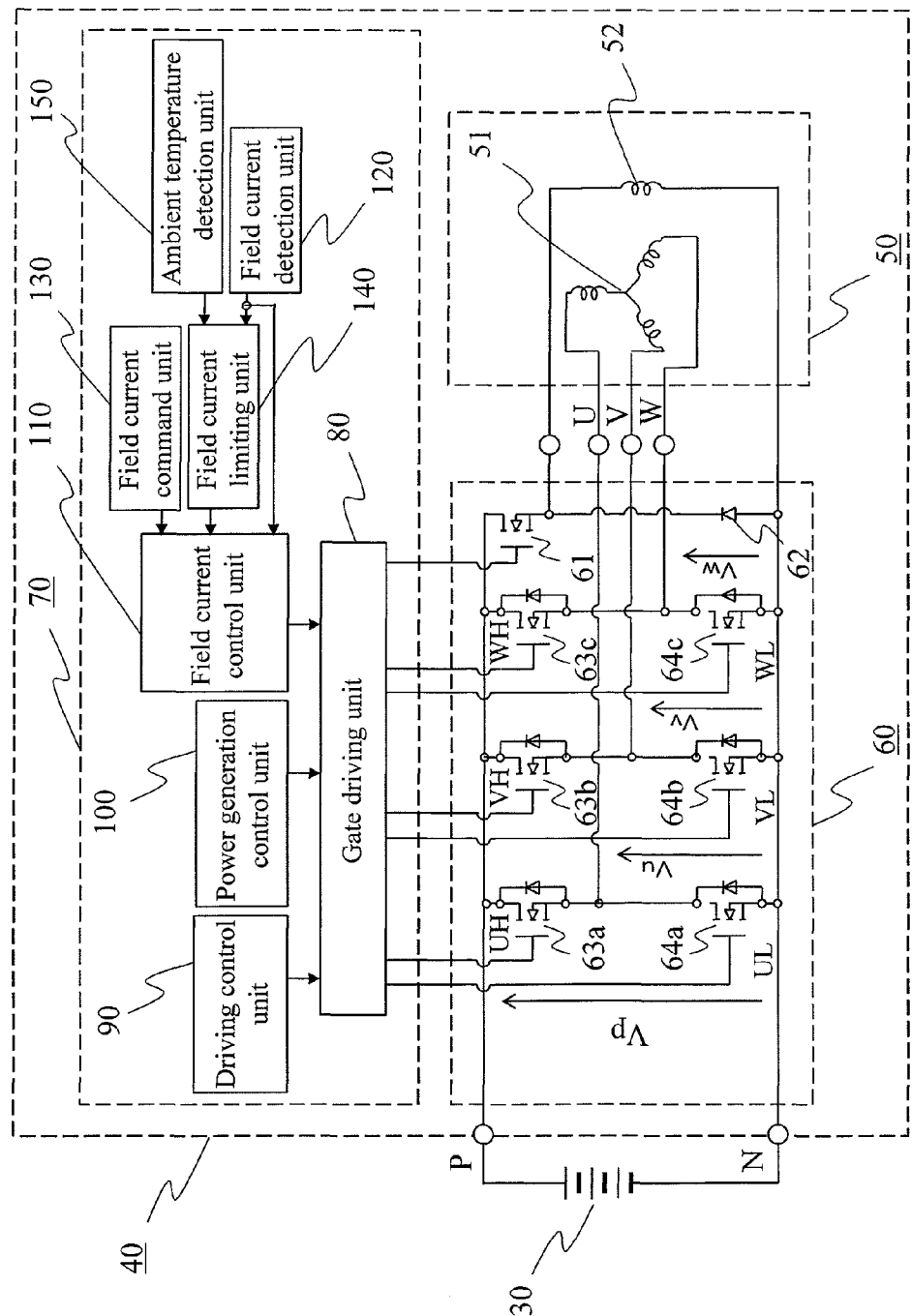
FIG. 5 is a configuration diagram of a field winding type rotary electric machine according to Embodiment 2 of the present invention.
Figure 6:
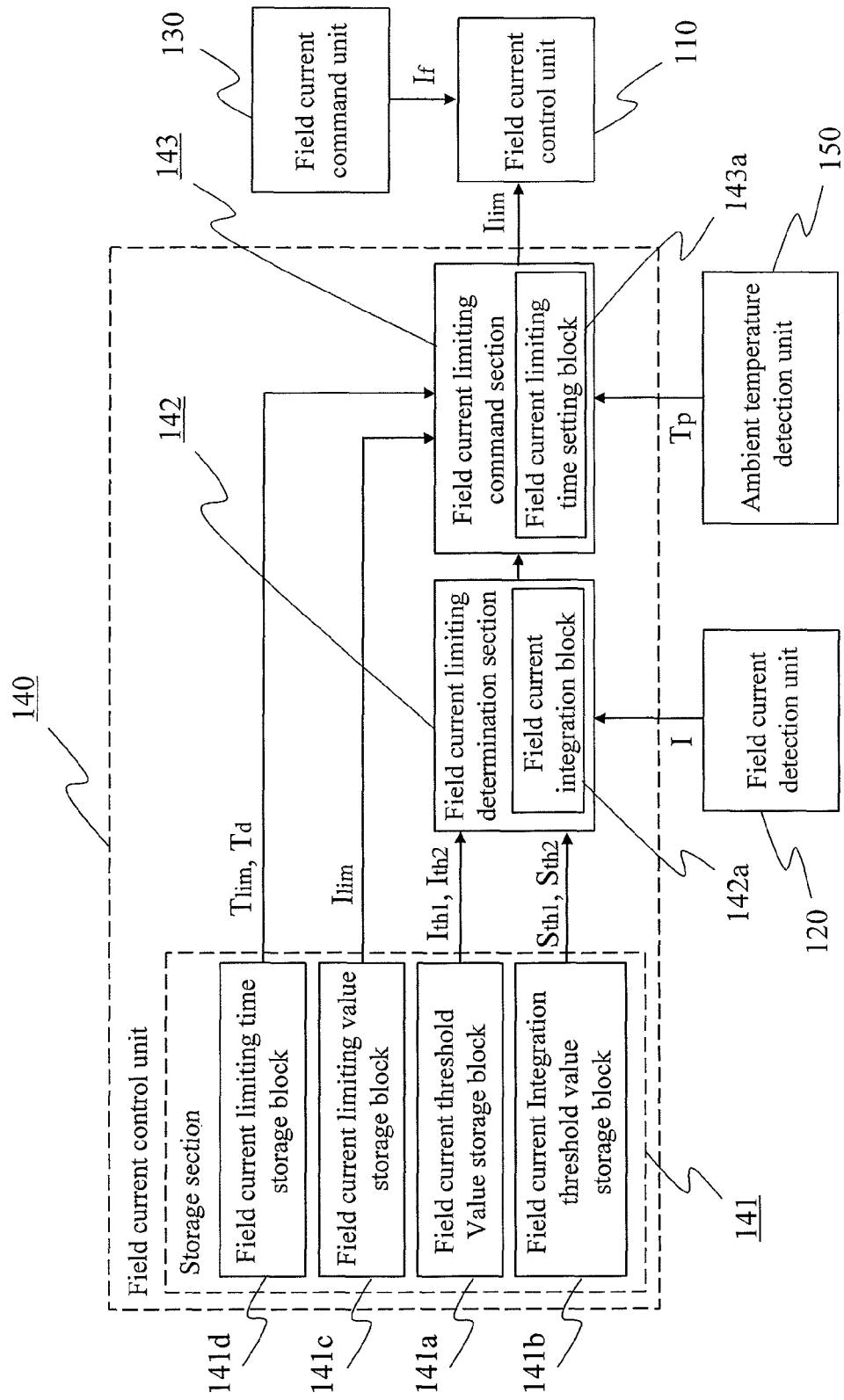
FIG. 6 is a configuration diagram of a field current limiting unit according to Embodiment 2 of the present invention.

FIG. 5 is a configuration diagram of a field winding type rotary electric machine according to Embodiment 2. FIG. 6 is a configuration diagram of a field current limiting unit. In Embodiment 1, the time which limits the field current is made to change depending on the value of the field current during the limiting of the field current; however, in Embodiment 2, limiting time of a field current is also made to further change by ambient temperature.

As shown in FIG. 5 and FIG. 6, the field winding type rotary electric machine of Embodiment 2 includes an ambient temperature detection unit 150 which detects ambient temperature Tp of a field winding type rotary electric machine 40; and the ambient temperature detection unit 150 is connected to a field current limiting command section 143 of a field current limiting unit 140. Except for this point, the configuration of Embodiment 2 is the same as that shown in FIG. 2 and FIG. 3 of Embodiment 1; and therefore, the description of other configuration will not be repeated.

An ambient temperature-field current limiting time map; $T_{lim}(Tp(x))$ which represents the relationship between ambient temperature Tp and limiting time of a field current I is preliminarily stored in a field current limiting time storage block 141*d*. In the ambient temperature-field current limiting time map; $T_{lim}(Tp(x))$, limiting time $T_{lim}$ of the field current I is set to be short in the case where the ambient temperature Tp is low; on the contrary, in the case where the ambient temperature Tp is high, the limiting time $T_{lim}$ of the field current I is set to be long.

Next, in the case where it is determined that limiting of the field current I is necessary on the basis of a determined result of a field current limiting determination section 142, the field current limiting command section 143 obtains the limiting time (field current limiting time $T_{lim}$) corresponding to detected ambient temperature Tp(x) as the field current limiting time $T_{lim}$ from the ambient temperature-field current limiting time map; $T_{lim}(Tp(x))$ of the field current limiting time storage block 141*d* and stores in a Field current limiting time set value T.

$$T = T_{lim} \qquad (3)$$
$$= T_{lim}(Tp(x))$$

This makes it possible to change the field current limiting time $T_{lim}$ by the ambient temperature Tp. Incidentally, other operation is the same as that of Embodiment 1; and therefore, the description will not be repeated.

As described above, in the field winding type rotary electric machine according to Embodiment 2, together with the effects of Embodiment 1, the time which limits the field current can also be made to change by the ambient temperature; and therefore, there is an effect in that, for example, under conditions where the ambient temperature is low and heat dissipation performance is good, the limiting time of the field current can be shortened and the field current can be limited as needed.

Incidentally, in Embodiment 2, the description has been made on the case where the limiting time $T_{lim}$ of the field current I is made to change by the ambient temperature Tp; however, for example, a limiting value of the field current I may be made to change by the ambient temperature Tp. That is, the limiting value of the field current I is made to change and accordingly the time in which a field current integration value S reaches a second field current integration threshold value $S_{th2}$ is changed by the ambient temperature Tp during the limiting of the field current; therefore, the same effect can be obtained.

Embodiment 3

Figure 7:
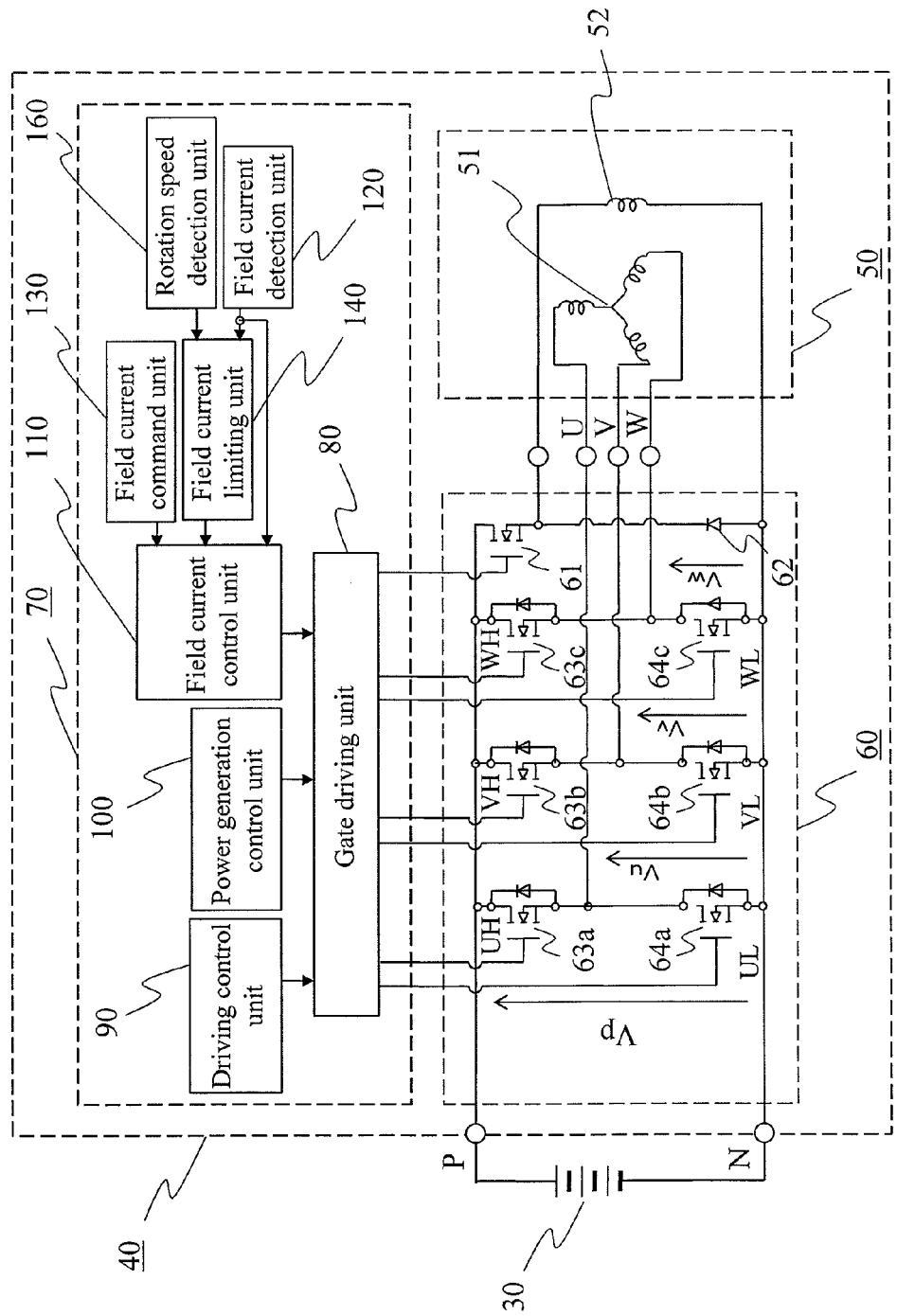
FIG. 7 is a configuration diagram of a field winding type rotary electric machine according to Embodiment 3 of the present invention.
Figure 8:
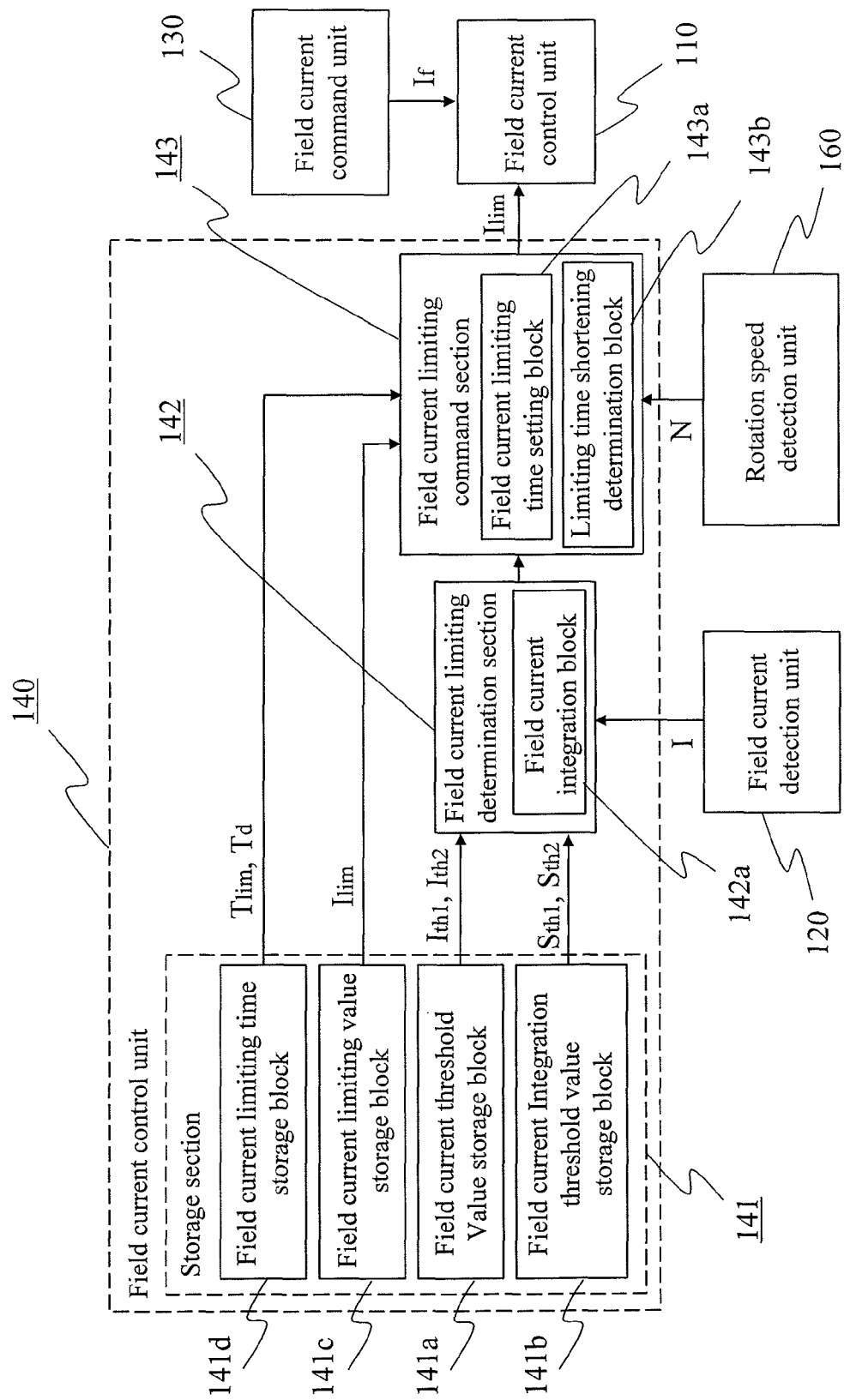
FIG. 8 is a configuration diagram of a field current limiting unit according to Embodiment 3 of the present invention.

FIG. 7 is a configuration diagram of a field winding type rotary electric machine in Embodiment 3. FIG. 8 is a configuration diagram of a field current limiting unit of the field winding type rotary electric machine. In Embodiment 2, the field current limiting time is made to change by ambient temperature; however, in Embodiment 3, limiting time of a field current is made to change by rotational speed of the rotary electric machine.

As shown in FIG. 7 and FIG. 8, the field winding type rotary electric machine of Embodiment 3 includes a rotational speed detection unit 160 which detects rotational speed N of a motor generator 50, and the rotational speed detection unit 160 is connected to a field current limiting command section 143 of a field current limiting unit 140. As compared to the storage section 141 shown in FIG. 3 in Embodiment 1, a storage section 141 shown in FIG. 8 in Embodiment 3 includes a limiting time shortening threshold value storage block 141*e*. Limiting time shortening rotational speed $N_{th}$ and limiting time shortening determination time $T_N$ are stored in the limiting time shortening threshold value storage block 141*e* preliminarily. Furthermore, the field current limiting command section 143 includes a limiting time shortening determination block 143*b*. Except for these points, the configuration of Embodiment 3 is the same as that shown in FIG. 2 and FIG. 3 of Embodiment 1; and therefore, the description will not be repeated.

Generally, the motor generator introduces cooling wind to the inside by the rotation thereof and accordingly the inside can be cooled. An effect of inside cooling by this cooling wind is largely different depending on rotational speed. Then, in Embodiment 3, in the case where a state in which the rotational speed N is equal to or higher than a predetermined value continues for a predetermined time, it is determined that inside cooling is accelerated and the limiting time of the field current is shortened.

In the case where it is determined that limiting of the field current I is necessary on the basis of a determined result of a field current limiting determination section 142, the field current limiting command section 143 obtains field current limiting time $T_{lim}$ and field current limiting shortening time $T_d$ from a field current limiting time storage block 141d and sets the field current limiting time $T_{lim}$ as a field current limiting time set value T.

Furthermore, the field current limiting command section 143 compares the rotational speed N detected by the rotational speed detection unit 160 with the limiting time shortening rotational speed $N_{th}$ preliminarily stored in the limiting time shortening threshold value storage block 141e. Next, in the case where the rotational speed exceeds the limiting time shortening rotational speed, the limiting time shortening determination block 143b starts measurement of continuous operation time under conditions that the rotational speed N is higher than the limiting time shortening rotational speed $N_{th}$.

Next, at the time when the continuous operation time under the conditions that the rotational speed N is higher than the limiting time shortening rotational speed $N_{th}$ reaches the limiting time shortening determination time $T_N$, the field current limiting command section 143 determines that the limiting time of the field current is capable of being shortened and subtracts the field current limiting shortening time $T_d$ from the field current limiting time set value T.

Incidentally, in the case where a rotary electric machine 40 rotates at the limiting time shortening rotational speed $N_{th}$ for the limiting time shortening determination time $T_N$, the limiting time shortening determination time $T_N$ is preliminarily set to a value so that the limiting time of the field current I is capable of being shortened by the field current limiting shortening time $T_d$ by a cooling effect due to the rotation.

Furthermore, the relationship between the limiting time shortening rotational speed $N_{th}$ and the limiting time shortening determination time $T_N$ is stored as a map, and shortening conditions of the limiting time of the field current I may be made to change by the rotational speed N.

This makes it possible to change the limiting time of the field current by the rotational speed. Incidentally, subsequent operation is the same as that of the aforementioned Embodiment 1; and therefore, the description will not be repeated.

As described above, in the field winding type rotary electric machine according to Embodiment 3, together with the effects of Embodiment 1, the time which limits the field current can be made to change by the rotational speed; and therefore, there is an effect in that, for example, under conditions where the rotational speed is high and the cooling effect is high due to cooling wind during the rotation, the limiting time of the field current can be shortened and the field current can be limited as needed.

Incidentally, in the present Embodiment 3, the description has been made on the case where the time which limits the field current is made to change by the rotational speed; however, even when a limiting value of the field current is made to change by the rotational speed, the same effect can be obtained.

Furthermore, the same reference numerals as those in the drawings represent the same or corresponding elements.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A field winding type rotary electric machine comprising:
   a motor generator having a field winding;
   a field current detection unit which detects a field current flowing through said field winding;
   a field current control unit which controls the field current;
   a field current limiting determination section which calculates a field current integration value in which the field current detected by said field current detection unit is integrated by time, and determines whether or not the field current integration value reaches a field current integration threshold value; and
   a field current limiting command section which, upon determination, by said field current limiting determination section, that the field current integration value reaches the field current integration threshold value, outputs a command which sets the field current to be lower than or equal to a predetermined field current limiting value to said field current control unit during a predetermined limiting time, and outputs a command which changes the predetermined limiting time depending on the field current.

2. The field winding type rotary electric machine according to claim 1,
   wherein said field current limiting command section outputs a command which shortens the predetermined limiting time when the field current is lower than the predetermined field current limiting value.

3. The field winding type rotary electric machine according to claim 1,
   further comprising an ambient temperature detection unit which detects ambient temperature of said motor generator,
   wherein said field current limiting command section outputs a command which changes the predetermined limiting time depending on a temperature detected by said ambient temperature detection unit.

4. The field winding type rotary electric machine according to claim 1,
   further comprising a rotational speed detection unit which detects rotational speed of said motor generator,
   wherein said field current limiting command section outputs a command which makes the predetermined limiting time change depending on the rotational speed detected by said rotational speed detection unit.

5. The field winding type rotary electric machine according to claim 1,
   further comprising an ambient temperature detection unit which detects ambient temperature of said motor generator,
   wherein said field current limiting command section outputs a command which makes the predetermined field current limiting value change depending on temperature detected by said ambient temperature detection unit.

6. The field winding type rotary electric machine according to claim 1,
   further comprising a rotational speed detection unit which detects rotational speed of said motor generator,
   wherein said field current limiting command section outputs a command which makes the predetermined field current limiting value change depending on the rotational speed detected by said rotational speed detection unit.

7. The field winding type rotary electric machine according to claim 2,
   further comprising an ambient temperature detection unit which detects ambient temperature of said motor generator,
   wherein said field current limiting command section outputs a command which changes the predetermined limiting time depending on a temperature detected by said ambient temperature detection unit.

8. The field winding type rotary electric machine according to claim 2,
   further comprising a rotational speed detection unit which detects rotational speed of said motor generator,
   wherein said field current limiting command section outputs a command which makes the predetermined limiting time change depending on the rotational speed detected by said rotational speed detection unit.

9. The field winding type rotary electric machine according to claim 2,
   further comprising an ambient temperature detection unit which detects ambient temperature of said motor generator,
   wherein said field current limiting command section outputs a command which makes the predetermined field current limiting value change depending on temperature detected by said ambient temperature detection unit.

10. The field winding type rotary electric machine according to claim 2,
    further comprising a rotational speed detection unit which detects rotational speed of said motor generator,
    wherein said field current limiting command section outputs a command which makes the predetermined field current limiting value change depending on the rotational speed detected by said rotational speed detection unit.

* * * * *